(12) United States Patent
Hashizume

(10) Patent No.: US 12,583,184 B2
(45) Date of Patent: Mar. 24, 2026

(54) THREE-DIMENSIONAL MODELING APPARATUS

(71) Applicant: SEIKO EPSON CORPORATION, Tokyo (JP)

(72) Inventor: Keitaro Hashizume, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 18/314,179

(22) Filed: May 9, 2023

(65) Prior Publication Data

US 2023/0364864 A1      Nov. 16, 2023

(30) Foreign Application Priority Data

May 12, 2022    (JP) ................................. 2022-078678

(51) Int. Cl.
B29C 64/393 (2017.01)
B22F 10/31 (2021.01)
B29C 64/118 (2017.01)
B29C 64/209 (2017.01)
B33Y 30/00 (2015.01)
(Continued)

(52) U.S. Cl.
CPC .......... B29C 64/393 (2017.08); B29C 64/118 (2017.08); B29C 64/209 (2017.08); B33Y 30/00 (2014.12); B33Y 50/02 (2014.12); B29K 2055/02 (2013.01)

(58) Field of Classification Search
CPC ... B29C 64/393; B29C 64/118; B29C 64/209; B29C 64/336; B29C 64/106; B29C 64/20; B29C 64/245; B29C 64/255; B29C 64/295; B29C 64/321; B29C 64/35;

B33Y 30/00; B33Y 40/00; B33Y 50/02; B22F 10/18; B22F 10/31; B22F 12/53; B22F 12/55; B22F 12/90
See application file for complete search history.

(56) References Cited

U.S. PATENT DOCUMENTS

| | | | |
|---|---|---|---|
| 2016/0193788 A1* | 7/2016 | Din ......................... | B33Y 50/02 |
| | | | 425/150 |
| 2016/0214323 A1* | 7/2016 | Mizes ...................... | H04N 1/40 |

(Continued)

FOREIGN PATENT DOCUMENTS

| | | |
|---|---|---|
| JP | 2008513252 | 5/2008 |
| JP | 2009532243 | 9/2009 |

(Continued)

*Primary Examiner* — Galen H Hauth
*Assistant Examiner* — Baileigh Kate Darnell
(74) *Attorney, Agent, or Firm* — WORKMAN NYDEGGER

(57) ABSTRACT

A movement mechanism relatively moving at least one of a first modeling head and a second modeling head and a stage, and a control unit controlling the first modeling head, the second modeling head, and the movement mechanism are provided. The control unit controls the first modeling head to execute modeling of a first calibration member on the stage and the second modeling head to execute modeling of a second calibration member on the stage, the first calibration member has a plurality of modeling lines placed at first intervals in a first direction on the stage, and the second calibration member has a plurality of modeling lines placed at second intervals larger than the first intervals in the first direction on the stage.

12 Claims, 8 Drawing Sheets

(51) Int. Cl.
    *B33Y 50/02*         (2015.01)
    *B29K 55/02*         (2006.01)

(56)             References Cited

U.S. PATENT DOCUMENTS

2017/0015124 A1*   1/2017   Donaldson ............. B41J 29/393
2022/0396034 A1*  12/2022  Van Manen ......... B29C 64/393

FOREIGN PATENT DOCUMENTS

| | | |
|---|---|---|
| JP | 2016221869 | 12/2016 |
| JP | 2017-217792 A | 12/2017 |
| WO | 2006033903 | 3/2006 |
| WO | 2006034012 | 3/2006 |
| WO | 2007130220 | 11/2007 |

* cited by examiner

600

HEAD CALIBRATION

CURRENT CORRECTION VALUES     NEW CORRECTION VALUES

X: +0.1mm     +0.1 mm

Y: −0.2mm     0.0 mm

UPDATE

HEAD CALIBRATION (X DIRECTIONS)     316     310A1,310A

316a

315

317a     317     320A1,320A     UPDATE

*FIG. 11*

| SCALE FORMAT | MINIMUM READING VALUE |
|---|---|
| EQUALLY DIVIDE 9 mm IN 10 | 0.1 |
| EQUALLY DIVIDE 19 mm IN 10 | 0.1 |
| EQUALLY DIVIDE 19 mm IN 20 | 0.05 |
| EQUALLY DIVIDE 39 mm IN 20 | 0.05 |
| EQUALLY DIVIDE 49 mm IN 50 | 0.02 |

THREE-DIMENSIONAL MODELING APPARATUS

The present application is based on, and claims priority from JP Application Serial Number 2022-078678, filed May 12, 2022, the disclosure of which is hereby incorporated by reference herein in its entirety.

BACKGROUND

1. Technical Field

The present disclosure relates to a three-dimensional modeling apparatus.

2. Related Art

JP-A-2017-217792 discloses a three-dimensional modeling apparatus calibrating a distance in a vertical direction between a tip portion of an injection nozzle and a mounting surface on a stage by measuring a distance between the tip portion of the injection nozzle in a modeling head and a stage sensor in the modeling head.

However, in the technique disclosed in JP-A-2017-217792, when a plurality of modeling heads are provided, there are problems that, if the positions of the modeling heads in directions along a horizontal plane are not calibrated, the dimensional precision of a modeled object is lower and the strength of the modeled object is lower. That is, a three-dimensional modeling apparatus that configured to calibrate displacement of the plurality of modeling heads in the directions along the horizontal plane is desired.

SUMMARY

A three-dimensional modeling apparatus according to an aspect of the present disclosure includes a stage, a first modeling head having a first nozzle supplying a first material to the stage, a second modeling head having a second nozzle supplying a second material different from the first material to the stage, a movement mechanism relatively moving at least one of the first modeling head and the second modeling head and the stage, and a control unit controlling the first modeling head, the second modeling head, and the movement mechanism, wherein the control unit controls the first modeling head to execute modeling of a first calibration member on the stage and the second modeling head to execute modeling of a second calibration member on the stage, the first calibration member has a plurality of modeling lines placed at first intervals in a first direction on the stage, and the second calibration member has a plurality of modeling lines placed at second intervals larger than the first intervals in the first direction on the stage.

BRIEF DESCRIPTION OF THE DRAWINGS

FIG. 11 is a table for explanation of relationships between scale formats and minimum reading values.

DESCRIPTION OF EXEMPLARY EMBODIMENTS

Figure 1:
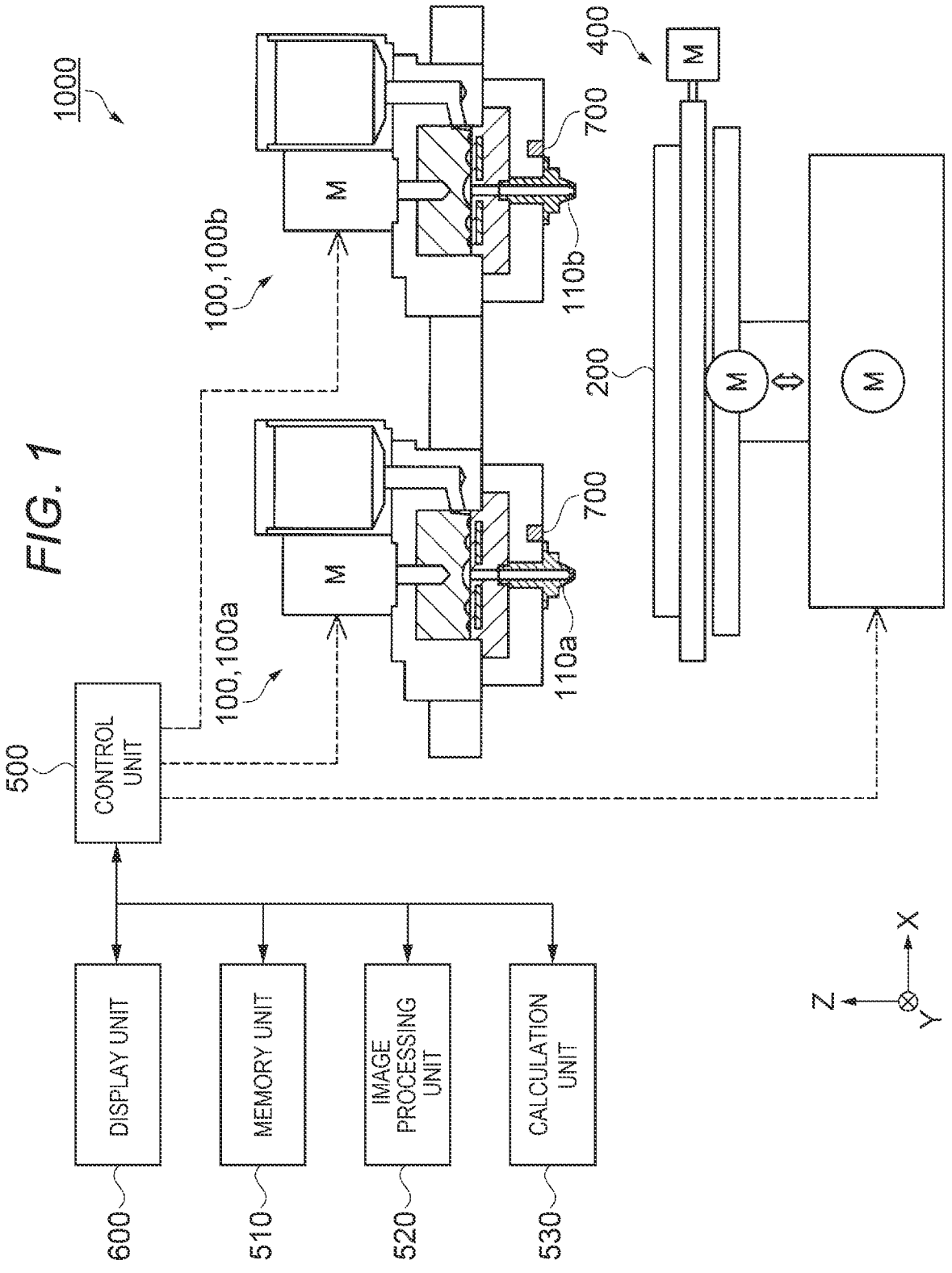
FIG. 1 is a sectional view showing a configuration of a three-dimensional modeling apparatus.

In the following respective drawings, three axes orthogonal to one another are an X-axis, a Y-axis, and a Z-axis. Directions along the X-axis are "X directions", directions along the Y-axis are "Y directions", and directions along the Z-axis are "Z directions", and the directions of arrows are "+ directions" and directions opposite to the + directions are "− directions". Note that the +Z direction may be also referred to as "upper" or "upside", the −Z direction may be also referred to as "lower" or "downside", and a view as seen from the +Z direction is also referred to as "plan view" or "planar view". Further, a surface at the + side in the Z direction is an upper surface and a surface at the − side in the Z direction opposite thereto is a lower surface.

First, a configuration of a three-dimensional modeling apparatus 1000 will be explained with reference to FIGS. 1 and 2.

The three-dimensional modeling apparatus 1000 changes relative positions of a modeling head 100 and a stage 200 by driving a movement mechanism 400 while injecting a modeling material 300 (see FIG. 2) formed by plasticization of a thermoplastic resin from the modeling head 100 to the stage 200. Thereby, the three-dimensional modeling apparatus 1000 models a three-dimensional modeled object 300a in a desired shape on the stage 200.

Figure 2:
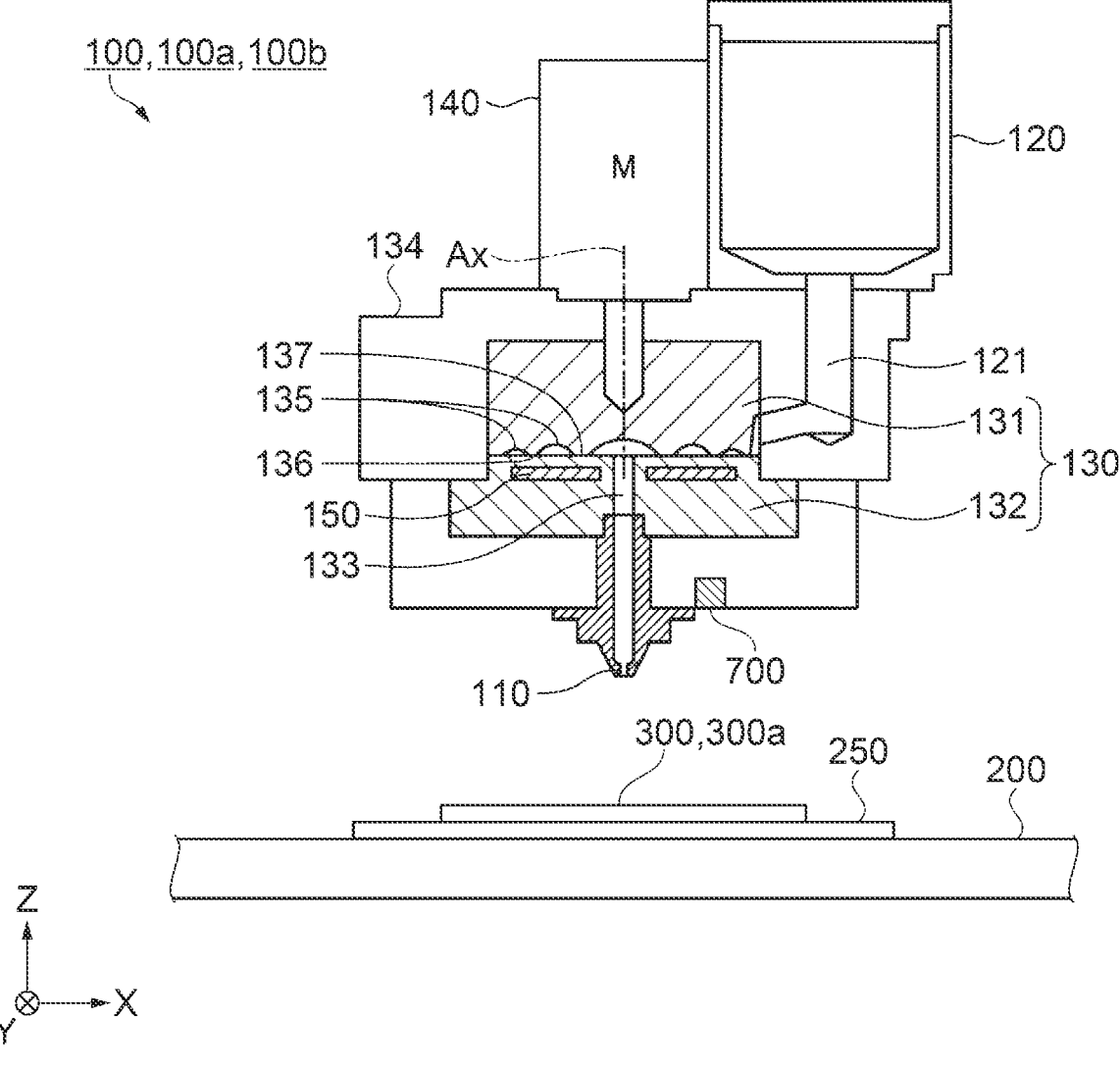
FIG. 2 is a sectional view showing a configuration of a modeling head.

As shown in FIG. 1, the three-dimensional modeling apparatus 1000 includes the stage 200, a first modeling head 100a and a second modeling head 100b placed in positions facing the stage 200, the movement mechanism 400, and a control unit 500 controlling the first modeling head 100a, the second modeling head 100b, and the movement mechanism 400.

The first modeling head 100a has a first nozzle 110a supplying a first material to the stage 200. The second modeling head 100b has a second nozzle 110b supplying a second material different from the first material to the stage 200.

As described above, the movement mechanism 400 relatively moves at least one of the first modeling head 100a and the second modeling head 100b and the stage 200. The movement mechanism 400 includes a three-axis positioner moving the stage 200 in the three axial directions of the X directions, the Y directions, and the Z directions by drive forces of three motors. The respective motors are driven under control of the control unit 500.

The control unit 500 includes a computer having e.g., a processor, a memory device, and an input/output interface for external input and output of signals. In the embodiment, the control unit 500 controls motions of the first modeling head 100a, the second modeling head 100b, and the movement mechanism 400 by the processor executing programs and commands stored in the memory device and executes modeling processing of modeling the three-dimensional modeled object 300a based on modeling data.

For example, the modeling data is created by reading shape data using slicer software installed in a computer connected to the three-dimensional modeling apparatus 1000. The shape data is data representing a target shape of the three-dimensional modeled object 300a created using three-dimensional CAD (Computer Aided Design) software or three-dimensional CG (Computer Graphics) software. As the shape data, e.g., data in the STL (Standard triangulated Language) format or AMF (Additive Manufacturing File Format) is used. The slicer software divides the target shape of the three-dimensional modeled object 300a in layers having predetermined thicknesses and creates modeling data with respect to each layer. The modeling data is represented by G codes.

The modeling data contains information on e.g., a movement path of the nozzle 110 with respect to the stage 200, an amount of the modeling material 300 injected from the nozzle 110, and the respective shapes and areas of the plurality of modeling layers forming the three-dimensional modeled object 300a. The control unit 500 acquires the modeling data from a computer connected to the three-dimensional modeling apparatus 1000 and a memory medium such as a USB (Universal Serial Bus) memory.

Next, a configuration of the modeling head 100 of one of the first modeling head 100a and the second modeling head 100b will be explained with reference to FIG. 2. Note that the first modeling head 100a and the second modeling head 100b have the same configuration and will be explained as the modeling head 100.

The modeling head 100 includes a material feeding unit 120, a material melting unit 130, and the nozzle 110. The material feeding unit 120 and the material melting unit 130 are coupled by a feed path 121. The material melting unit 130 and the nozzle 110 are coupled by a communication hole 133. The modeling head 100 stacks layers of the modeling material 300 in paste form obtained by melting of at least a part of a solid-state material on the stage 200.

The material feeding unit 120 contains a material in a state of pellets or powder. The first material and the second material of the embodiment are pelletized ABS resins. The material feeding unit 120 of the embodiment includes a hopper. The material contained in the material feeding unit 120 is fed to the material melting unit 130 via the feed path 121 provided at the downside of the material feeding unit 120.

The material melting unit 130 includes a case 134, a flat screw 131 housed within the case 134, a drive motor 140 driving the flat screw 131, and a barrel 132 fixed at the downside of the flat screw 131 within the case 134.

The flat screw 131 is a screw having a flattened cylindrical shape with a spiral groove portion 135 from the outer circumference of the cylinder to a center axis AX of the cylinder formed in the bottom surface of the cylinder. "Flattened" refers to a shape having a larger diameter than a height. The bottom surface of the flat screw 131 is referred to as "groove formation surface 136". The flat screw 131 is placed with the center axis AX parallel to the Z directions.

The drive motor 140 driving under control of the control unit 500 is coupled to the upper surface side of the flat screw 131. The flat screw 131 rotates within the case 134 by torque generated by the drive motor 140.

The barrel 132 has a screw facing surface 137 facing the groove formation surface 136 of the flat screw 131. The communication hole 133 is provided in a position on the center axis AX of the flat screw 131 in the screw facing surface 137. A heater 150 is provided inside of the barrel 132. The temperature of the heater 150 is controlled by the control unit 500.

At least a part of the material fed between the groove portion 135 of the rotating flat screw 131 and the screw facing surface 137 of the barrel 132 is melted by the rotation of the flat screw 131 and heating by the heater 150 into the paste modeling material 300 having fluidity. The modeling material 300 is fed to the communication hole 133 provided in the barrel 132 along the groove portion 135 by the rotation of the flat screw 131.

The nozzle 110 is coupled to the communication hole 133. The modeling material 300 fed from the material melting unit 130 through the communication hole 133 to the nozzle 110 is injected from the nozzle 110 toward the stage 200.

A foundation layer 250 is placed on the stage 200. On the foundation layer 250, the three-dimensional modeled object 300a modeled from the modeling material 300, i.e., first calibration members 310A, 310B and second calibration members 320A, 320B (see FIG. 3) are placed. In other words, the foundation layer 250 is placed between the first calibration members 310A, 310B and second calibration members 320A, 320B and the stage 200. Note that the foundation layer 250 includes e.g., a sample plate and a modeling sheet.

As described above, the foundation layer 250 is placed, and the first calibration members 310A, 310B and the second calibration members 320A, 320B are modeled on the foundation layer 250, and thereby, the foundation layer 250 having the first calibration members 310A, 310B and the second calibration members 320A, 320B may be detached from the stage 200 and checked. Further, the calibration members 310, 320 are modeled on the foundation layer 250, and thereby, for example, compared to a case where the calibration members 310, 320 are set in close contact with the stage 200, adhesion between the foundation layer 250 and the calibration members 310, 320 may be improved.

Note that the foundation layer 250 may be modeled using the first modeling head 100a or the second modeling head 100b. Thereby, the foundation layer may be easily formed without the need for preparation of another sample plate or modeling sheet.

As shown in FIG. 1, the three-dimensional modeling apparatus 1000 includes a display unit 600, a memory unit 510, an image processing unit 520, a calculation unit 530, and a camera 700 as an imaging unit in addition to the control unit 500.

For example, the display unit 600 displays modeling lines 310A1, 310B1, 320A1, 320B1 (see FIG. 3) imaged using the camera 700. Further, the display unit 600 has an input portion for correction of the amounts of displacement between the first modeling head 100a and the second modeling head 100b.

The camera 700 includes an imaging device e.g., a CCD (Charge Coupled Device) sensor or a CMOS (Complementary Metal Oxide Semiconductor) sensor.

The memory unit 510 stores e.g., images of the first calibration members 310A, 310B and the second calibration members 320A, 320B captured by the camera 700.

For example, the image processing unit 520 performs trimming processing of end portions 310a, 320a (see FIG. 4) of the first calibration members 310A, 310B and the second calibration members 320A, 320B to facilitate checking of the amounts of displacement of the first modeling head 100a and the second modeling head 100b.

For example, the calculation unit 530 calculates amounts of misalignment between the first calibration members 310A, 310B and the second calibration members 320A, 320B based on height information of the first calibration members 310A, 310B and height information of the second calibration members 320A, 320B.

Next, configurations of the first calibration members 310A, 310B and the second calibration members 320A, 320B will be explained with reference to FIG. 3.

Figure 3:
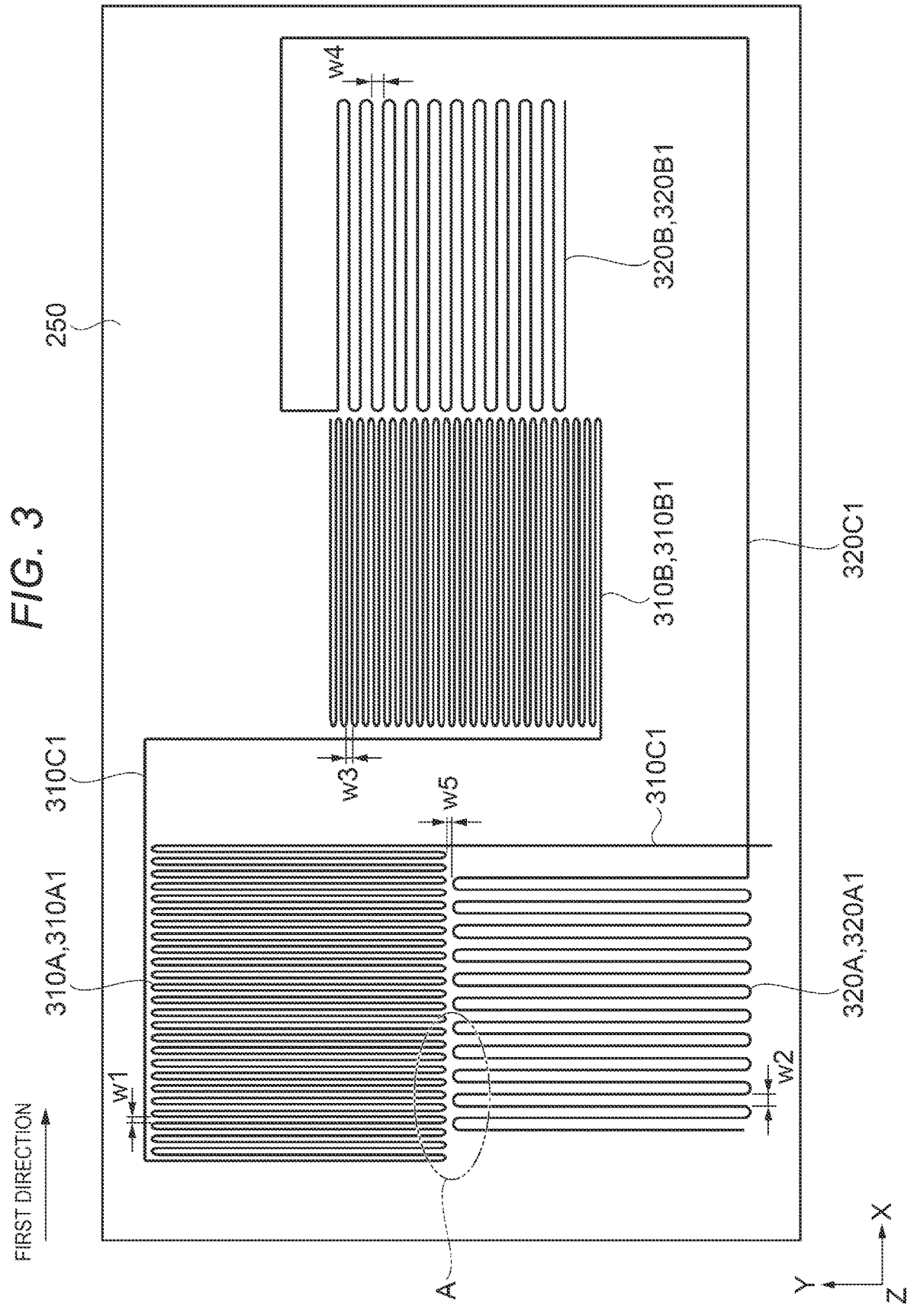
FIG. 3 is a plan view showing configurations of a first calibration member and a second calibration member.

As shown in FIG. 3, the foundation layer 250 is placed on the stage 200. On the foundation layer 250, the first calibration member 310A modeled by the first modeling head 100*a* and the second calibration member 320A modeled by the second modeling head 100*b* are placed at the side in the −X direction.

On the other hand, on the foundation layer 250, the first calibration member 310B modeled by the first modeling head 100*a* and the second calibration member 320B modeled by the second modeling head 100*b* are placed at the side in the +X direction.

The first calibration member 310A has a plurality of modeling lines 310A1 placed at first intervals W1 in a first direction. The second calibration member 320A has a plurality of modeling lines 320A1 placed at second intervals W2 larger than the first intervals W1 in the first direction. For example, the modeling lines 310A1, 320A1 are modeled unicursally.

The first calibration member 310B has a plurality of modeling lines 310B1 placed at first intervals W3 in a direction crossing the first direction. The second calibration member 320B has a plurality of modeling lines 320B1 placed at second intervals W4 larger than the first intervals W3 in the direction crossing the first direction. For example, the modeling lines 310B1, 320B1 are modeled unicursally.

The first calibration members 310A, 310B have e.g., square outer shapes of about 50 mm×50 mm. The widths of the modeling lines 310A1, 310B1 are e.g., 0.4 mm. The intervals between the adjacent modeling lines 310A1, 310B1 are e.g., 0.6 mm. Note that it is preferable that the line widths of the modeling lines 310A1, 310B1 are larger than the diameter of the nozzle 110 and equal to or smaller than the width of the modeling path.

The second calibration members 320A, 320B have e.g., rectangular outer shapes of about 50 mm×39 mm. The widths of the modeling lines 320A1, 320B1 are e.g., 0.5 mm. The intervals between the adjacent modeling lines 320A1, 320B1 are e.g., 1.45 mm.

Further, it is preferable that a distance W5 between the first calibration member 310A and the second calibration member 320A in the direction crossing the first direction is larger than the backlash gap in the movement mechanism 400. According to the settings, the distance W5 between the first calibration member 310A and the second calibration member 320A is set to be larger than the backlash gap, and thereby, an overlap between the first calibration member 310A and the second calibration member 320A may be suppressed. Therefore, for example, the contamination of the nozzle 110, which is caused by the contact of the nozzle 110 modeling the second calibration member 320A with the first calibration member 310A that has been already modeled, and lowering of the modeling precision may be suppressed.

A purge modeling line 310C1 formed when the first material is purged is placed between the first calibration member 310A and the first calibration member 310B. A purge modeling line 320C1 formed when the second material is purged is placed between the second calibration members 320A and the second calibration member 320B.

As described above, purge processing is performed on the stage 200, in other words, on the foundation layer 250 before the first calibration members 310A, 310B are modelled using the first modeling head 100*a*, and thereby, the line widths of the modeling lines 310A1, 310B1 of the first calibration members 310A, 310B may be stabilized.

On the other hand, purge processing is performed on the stage 200, in other words, on the foundation layer 250 before the second calibration members 320A, 320B are modelled using the second modeling head 100*b*, and thereby, the line widths of the modeling lines 320A1, 320B1 of the second calibration members 320A, 320B may be stabilized.

Next, a method of obtaining the amounts of displacement of the first modeling head 100*a* and the second modeling head 100*b* from the first calibration member 310A and the second calibration member 320A will be explained with reference to FIGS. 4 and 5.

Figure 4:
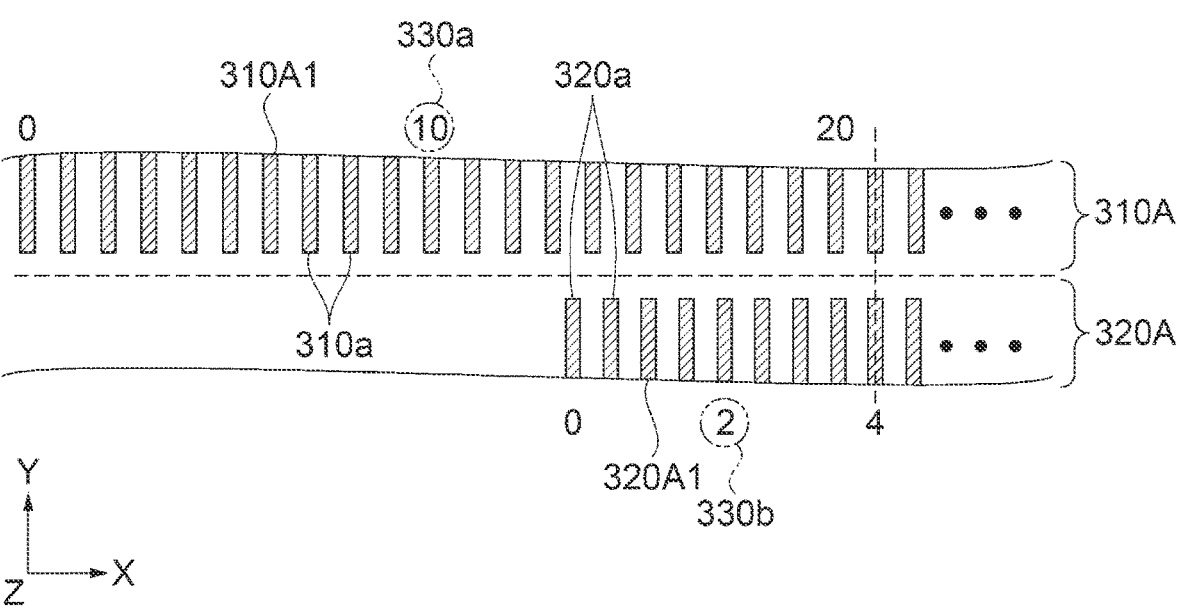
FIG. 4 is a plan view showing a relationship between modeling lines of the first calibration member and modeling lines of the second calibration member.

As shown in FIG. 4, the end portions 310*a* of the modeling lines 310A1 of the first calibration member 310A are trimmed by the image processing unit 520 and separated from the adjacent modeling lines 310A1. Further, the end portions 320*a* of the modeling lines 320A1 of the second calibration member 320A are trimmed by the image processing unit 520 and separated from the adjacent modeling lines 320A1.

That is, the end portions 310*a* of the modeling lines 310A1 of the first calibration member 310A and the end portions 320*a* of the modeling lines 320A1 of the second calibration member 320A may be made closer and distinctively displayed. Therefore, the amounts of displacement may be easily checked.

It is desirable that scale information 330*a* corresponding to the modeling lines 310A1 of the first calibration member 310A is modeled using the first modeling head 100*a*. For example, in FIG. 4, "0", "10", "20" are modeled as the scale information 330*a*.

On the other hand, it is desirable that scale information 330*b* corresponding to the modeling lines 320A1 of the second calibration member 320A is modeled using the second modeling head 100*b*. For example, in FIG. 4, "2", "4" are modeled as the scale information 330*b*.

As described above, the scale information 330*a*, 330*b*, in other words, numerals etc. are modeled, and thereby, visibility may be improved to facilitate recognition of the amounts of misalignment.

Figure 5:
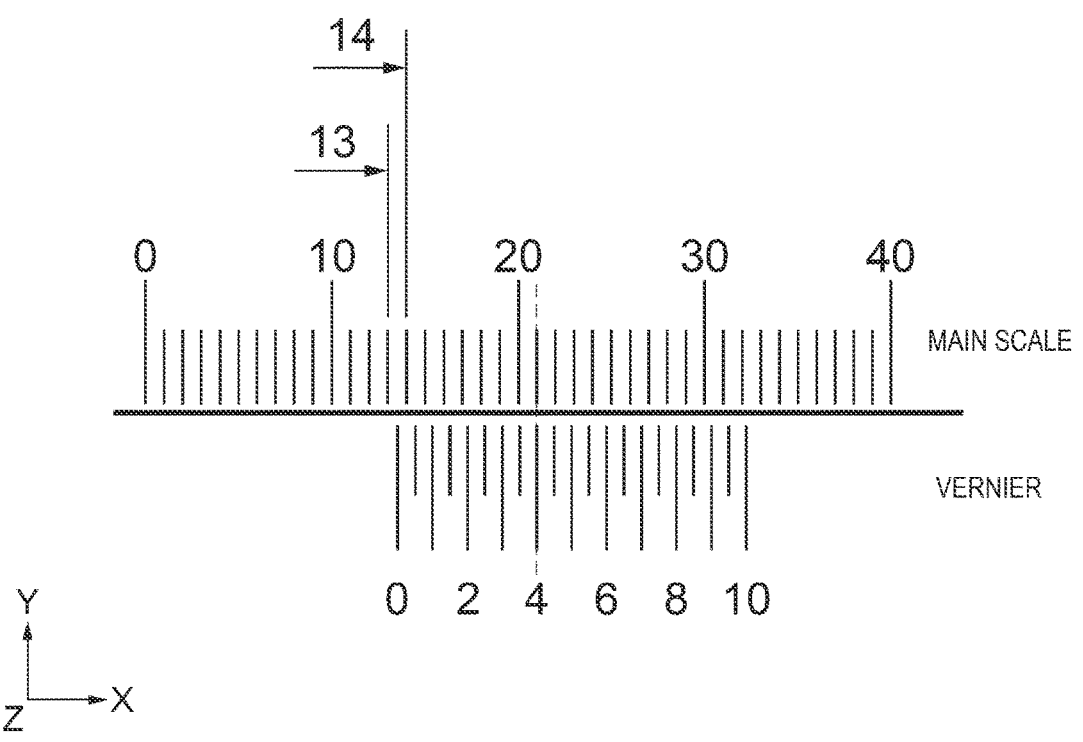
FIG. 5 is a diagram for explanation of how to read scales of the first calibration member and the second calibration member.

In FIG. 5, the method of obtaining the amounts of displacement of the first modeling head 100*a* and the second modeling head 100*b* from the first calibration member 310A and the second calibration member 320A shown in FIG. 4 is explained in an easy-to-understand way. That is, FIG. 5 is similar to a measuring method in slide calipers. The numeric value in this case can be read as e.g., 13.4.

That is, the first calibration member 310A modeled by the first modeling head 100*a* serves as a main scale and the second calibration member 320A modeled by the second modeling head 100*b* serves as a vernier. When the numeric value of the amount of displacement is zero, the positions of the modeling heads 100*a*, 100*b* are aligned with each other.

Next, a method of positioning the first modeling head 100*a* and the second modeling head 100*b* will be explained with reference to FIGS. 6 and 7.

First, for example, a user sequentially selects Menu, Maintenance, and Head Calibration in the entry window of the three-dimensional modeling apparatus 1000. When receiving a signal relating to execution of the head calibration, the control unit 500 reads out modeling data for head calibration from the memory unit 510.

Then, the control unit 500 controls the first modeling head 100*a* to execute modeling of the first calibration members 310A, 310B on the foundation layer 250 of the stage 200 based on the read-out modeling data (see FIG. 3). Further, the control unit 500 controls the second modeling head 100*b* to execute modeling of the second calibration members 320A, 320B on the foundation layer 250 of the stage 200.

Then, the control unit 500 controls the camera 700 to execute imaging of the first calibration members 310A, 310B and the second calibration members 320A, 320B and controls the memory unit 510 to store captured first calibration member images 310A2, 310B2 and second calibration member images 320A2, 320B2.

As described above, the captured images of the first calibration members 310A, 310B and the second calibration members 320A, 320B are stored in the memory unit 510, and thereby, even after a certain period of time elapses from imaging, the amounts of misalignment may be calibrated.

Then, the control unit 500 controls the image processing unit 520 to read out the stored first calibration member images 310A2, 310B2 and second calibration member images 320A2, 320B2 and execute trimming processing of the end portions 310*a* (see FIG. 4) of the first calibration members 310A, 310B and the end portions 320*a* of the second calibration members 320A, 320B.

Then, the control unit 500 displays the trimmed first calibration member image 310A2 and the trimmed second calibration member image 320A2 side by side in the display unit 600. That is, the images show the amount of misalignment in the X directions in the first modeling head 100*a* and the second modeling head 100*b*.

Further, the control unit 500 displays the trimmed first calibration member image 310B2 and the trimmed second calibration member image 320B2 side by side in the display unit 600. That is, the images show the amount of misalignment in the Y directions in the first modeling head 100*a* and the second modeling head 100*b*.

According to the display, even when the first calibration members 310A, 310B and the second calibration members 320A, 320B are modeled unicursally, the end portions 310*a*, 320*a* are trimmed, and thereby, the end portions 310*a*, 320*a* of the necessary modeling lines 310A1, 310B1, 320A1, 320B1 may be distinctively displayed. Therefore, the amounts of misalignment between the first calibration members 310A, 310B and the second calibration members 320A, 320B may be easily obtained.

Figure 6:
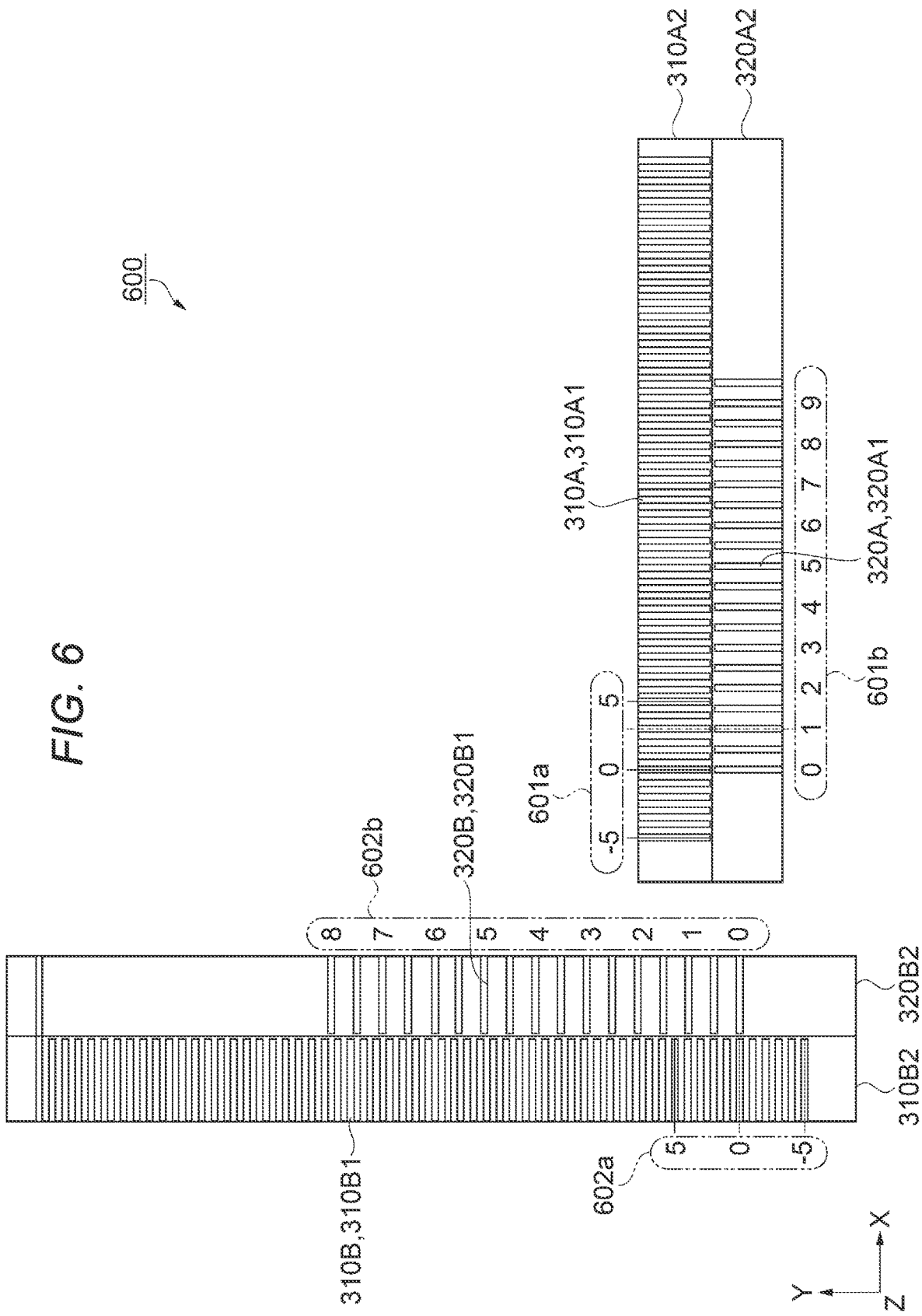
FIG. 6 is a diagram for explanation of amounts of displacement in X directions and Y directions.

As shown in FIG. 6, the amount of misalignment in the X directions in the first modeling head 100*a* and the second modeling head 100*b* is −0.1 mm. On the other hand, the amount of misalignment in the Y directions is 0.0 mm.

Specifically, in the X directions or the Y directions, the lines in which the modeling lines 310A1, 310B1 of the first calibration members 310A, 310B and the modeling lines 320A1, 320B1 of the second calibration members 320A, 320B are aligned are found. Then, the amounts of misalignment are obtained based on a reference point, i.e., the number of lines from zero.

That is, the second modeling head 100*b* is corrected in the X direction by +0.1 mm and corrected in the Y direction by 0.0 mm, and thereby, calibrations of the modeling heads 100*a*, 100*b* are completed.

Note that it is preferable that the display unit 600 displays scale information 601*a*, 602*a* corresponding to the modeling lines 310A1, 310B1 of the first calibration members 310A, 310B and scale information 601*b*, 602*b* corresponding to the modeling lines 320A1, 320B1 of the second calibration members 320A, 320B. According to the display, numerals etc. are displayed, and thereby, visibility may be improved to facilitate recognition of the amounts of misalignment.

As described above, the images are displayed on the display unit 600, and thereby, the amounts of misalignment may be obtained from the display unit 600 without direct check of the first calibration members 310A, 310B and the second calibration members 320A, 320B. Therefore, the amounts of misalignment may be calibrated without changes in environment, e.g., the modeling temperature of the modeling space in the three-dimensional modeling apparatus 1000. Thereby, lowering of productivity may be suppressed.

Figure 7:
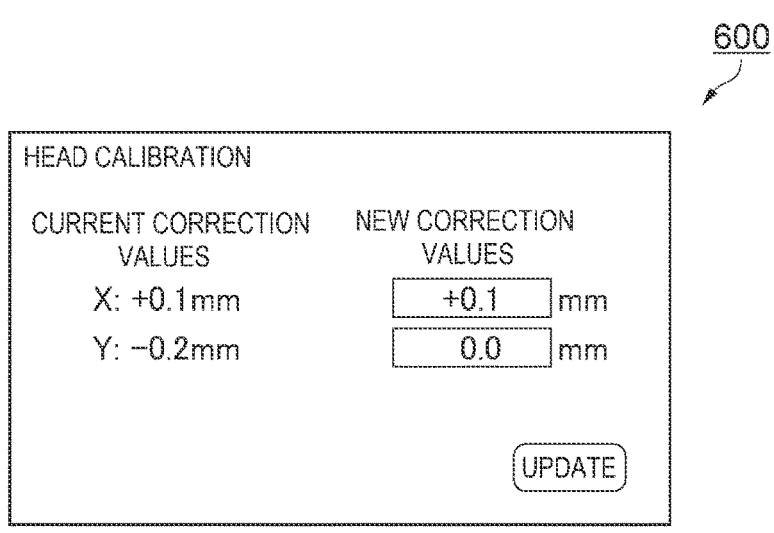
FIG. 7 shows display contents of a display unit.

Then, as shown in FIG. 7, the control unit 500 controls the display unit 600 to display a calibration window for the head into which calibration values obtained from the first calibration members 310A, 310B and the second calibration members 320A, 320B can be entered.

The user enters numeric values for correction in entry boxes for new correction values based on the amount of misalignment in the X directions and the amount of misalignment in the Y directions. Specifically, the amount is −0.1 mm in the X direction and +0.1 mm is entered. On the other hand, there is no misalignment in the Y direction, 0.0 mm is entered. After the entry, an update button is pressed and the latest correction values are set. Note that the correction values are stored in the memory unit 510.

As described above, the three-dimensional modeling apparatus 1000 of the embodiment includes the stage 200, the first modeling head 100*a* having the first nozzle 110*a* supplying the first material to the stage 200, the second modeling head 100*b* having the second nozzle 110*b* supplying the second material different from the first material to the stage 200, the movement mechanism 400 relatively moving at least one of the first modeling head 100*a* and the second modeling head 100*b* and the stage 200, and the control unit 500 controlling the first modeling head 100*a*, the second modeling head 100*b*, and the movement mechanism 400, the control unit 500 controls the first modeling head 100*a* to execute modeling of the first calibration members 310A, 310B on the stage 200, controls the second modeling head 100*b* to execute modeling of the second calibration members 320A, 320B on the stage 200, the first calibration member 310A has the plurality of modeling lines 310A1 placed at the first intervals W1 in the first direction on the stage 200, and the second calibration member 320A has the plurality of modeling lines 320A1 placed at the second intervals W2 larger than the first intervals W1 in the first direction on the stage 200.

According to the configuration, the first calibration members 310A, 310B are modeled by the first modeling head 100*a* and the second calibration members 320A, 320B are modelled by the second modeling head 100*b*. In comparison between the first calibration members 310A, 310B and the second calibration members 320A, 320B, the amounts of displacement of the modeling heads 100*a*, 100*b* in the first direction may be recognized from the amounts of misalignment of the modeling lines 310A1, 310B1, 320A1, 320B1. Therefore, the positions of the modeling heads 100*a*, 100*b* are calibrated based on the amounts of displacement, and thereby, lowering of the dimensional precision of the modeled object and lowering of the strength of the modeled object may be suppressed.

Further, in the three-dimensional modeling apparatus 1000 of the embodiment, the distances W5 between the first calibration members 310A, 310B and the second calibration members 320A, 320B may be larger than the backlash gap in the movement mechanism 400. According to the configuration, the distances between the first calibration members 310A, 310B and the second calibration members 320A, 320B are set to be larger than the backlash gap, and thereby, overlaps between the first calibration members 310A, 310B and the second calibration members 320A, 320B may be suppressed. Therefore, the attachment of the molten material to the nozzle 110 during modeling and lowering of the modeling precision may be suppressed.

In the three-dimensional modeling apparatus 1000 of the embodiment, the foundation layer 250 may be placed between the first calibration members 310A, 310B and second calibration members 320A, 320B and the stage 200. According to the configuration, the foundation layer 250 is placed, and thereby, the first calibration members 310A, 310B and the second calibration members 320A, 320B are modeled on the foundation layer 250, and thereby, the foundation layer 250 having the first calibration members 310A, 310B and the second calibration members 320A, 320B may be detached from the stage 200 and checked. Further, the calibration members 310, 320 are modeled on the foundation layer 250, and thereby, for example, compared to a case where the calibration members 310, 320 are set in close contact with the stage 200, adhesion between the foundation layer 250 and the calibration members 310, 320 may be improved.

In the three-dimensional modeling apparatus 1000 of the embodiment, the foundation layer 250 may be modeled using the first modeling head 100*a* or the second modeling head 100*b*. According to the configuration, the foundation layer 250 is modeled using the first modeling head 100*a* or the second modeling head 100*b*, and thereby, the foundation layer may be easily formed without the need for preparation of e.g., another plate or sheet.

In the three-dimensional modeling apparatus 1000 of the embodiment, the control unit 500 may control modeling of the scale information 330*a* corresponding to the modeling lines 310A1, 310B1 of the first calibration members 310A, 310B using the first modeling head 100*a* or the second modeling head 100*b* and modeling of the scale information 330*b* corresponding to the modeling lines 320A1, 320B1 of the second calibration members 320A, 320B using the first modeling head 100*a* or the second modeling head 100*b*. According to the configuration, the scale information 330*a*, 330*b*, in other words, numerals etc. are modeled, and thereby, visibility may be improved to facilitate recognition of the amounts of misalignment.

The three-dimensional modeling apparatus 1000 of the embodiment may include the camera 700 configured to image at least ones of the first calibration members 310A, 310B and the second calibration members 320A, 320B and the memory unit 510 storing the images captured by the camera 700. According to the configuration, the captured images of the first calibration members 310A, 310B and the second calibration members 320A, 320B are stored, and thereby, even after a certain period of time elapses from imaging, the amounts of misalignment may be calibrated.

The three-dimensional modeling apparatus 1000 of the embodiment may include the display unit 600 displaying the images of the first calibration members 310A, 310B and the second calibration members 320A, 320B captured by the camera 700 and the calibration window configured to enter the calibration values obtained from the first calibration members 310A, 310B and the second calibration members 320A, 320B. According to the configuration, the images are displayed on the display unit 600, and thereby, the amounts of misalignment may be obtained from the display unit 600 without direct check of the first calibration members 310A, 310B and the second calibration members 320A, 320B. Therefore, the amounts of misalignment may be calibrated without changes in environment, e.g., the modeling temperature of the modeling space in the three-dimensional modeling apparatus 1000. Thereby, lowering of the productivity may be suppressed.

The three-dimensional modeling apparatus 1000 of the embodiment may include the image processing unit 520, the memory unit 510 may store the first calibration member images 310A2, 310B2 obtained by imaging of the first calibration members 310A, 310B by the camera 700 and the second calibration member images 320A2, 320B2 obtained by imaging of the second calibration members 320A, 320B by the camera 700, the image processing unit 520 may trim the stored end portions 310*a* of the first calibration member images 310A2, 310B2 and end portions 320*a* of the second calibration member images 320A2, 320B2, and the display unit 600 may display the trimmed first calibration member images 310A2, 310B2 and the trimmed second calibration member images 320A2, 320B2 side by side. According to the configuration, for example, even when the first calibration members 310A, 310B and the second calibration members 320A, 320B are modeled unicursally, the end portions 310*a*, 320*a* are trimmed, and thereby, the end portions 310*a*, 320*a* of the necessary modeling lines 310A1, 310B1, 320A1, 320B1 may be distinctively displayed. Therefore, the amounts of misalignment between the first calibration members 310A, 310B and the second calibration members 320A, 320B may be easily obtained.

In the three-dimensional modeling apparatus 1000 of the embodiment, the display unit 600 may display the scale information 601*a*, 602*a* corresponding to the modeling lines 310A1, 310B1 of the first calibration members 310A, 310B and the scale information 601*b*, 602*b* corresponding to the modeling lines 320A1, 320B1 of the second calibration members 320A, 320B. According to the configuration, the scale information 601*a*, 602*a*, 601*b*, 602*b*, in other words, numerals etc. are displayed, and thereby, visibility may be improved to facilitate recognition of the amounts of misalignment.

In the three-dimensional modeling apparatus 1000 of the embodiment, the control unit 500 may purge the first material on the stage 200 or in a maintenance position before modeling of the first calibration members 310A, 310B using the first modeling head 100*a* and purge the second material on the stage 200 or in the maintenance position before modeling of the second calibration members 320A, 320B using the second modeling head 100*b*. According to the configuration, purge processing is performed before the first calibration members 310A, 310B for obtainment of the amounts of alignment are modelled, and thereby, the line widths of the first calibration members 310A, 310B and the second calibration members 320A, 320B can be stabilized and the amounts of alignment may be accurately obtained.

As below, modified examples of the above described embodiment will be explained.

Figure 8:
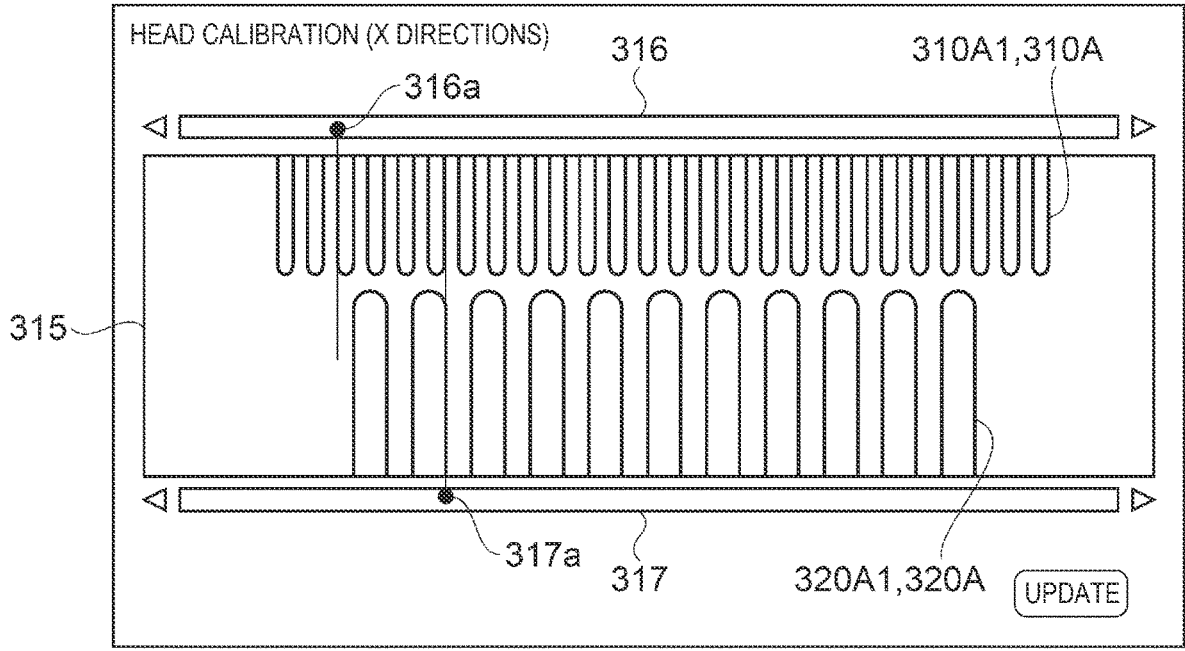
FIG. 8 shows display contents of the display unit.

Not limited to the side-by-side display of the trimmed first calibration member image 310A2 and second calibration member image 320A2 as described above, but, for example, a configuration shown in FIG. 8 may be employed. FIG. 8 shows an image obtained by imaging of a part A in FIG. 3, i.e., an untrimmed captured image 315.

First, the captured image 315, a reference bar setting portion 316 having a reference bar 316*a*, and a measurement bar setting portion 317 having a measurement bar 317*a* for measuring the amount of displacement are displayed on the display unit 600. Then, arrow buttons are operated and the reference bar 316a is placed in a reference position. Here, the fifth line from the left is the reference position. Then, the arrow buttons are operated and the measurement bar 317a is placed in a position where the modeling line 310A1 and the modeling line 320A1 are aligned. The update button is pressed, and then, a correction value is calculated in the calculation unit 530 based on the image and stored in the memory unit 510.

Figures 9, 10:
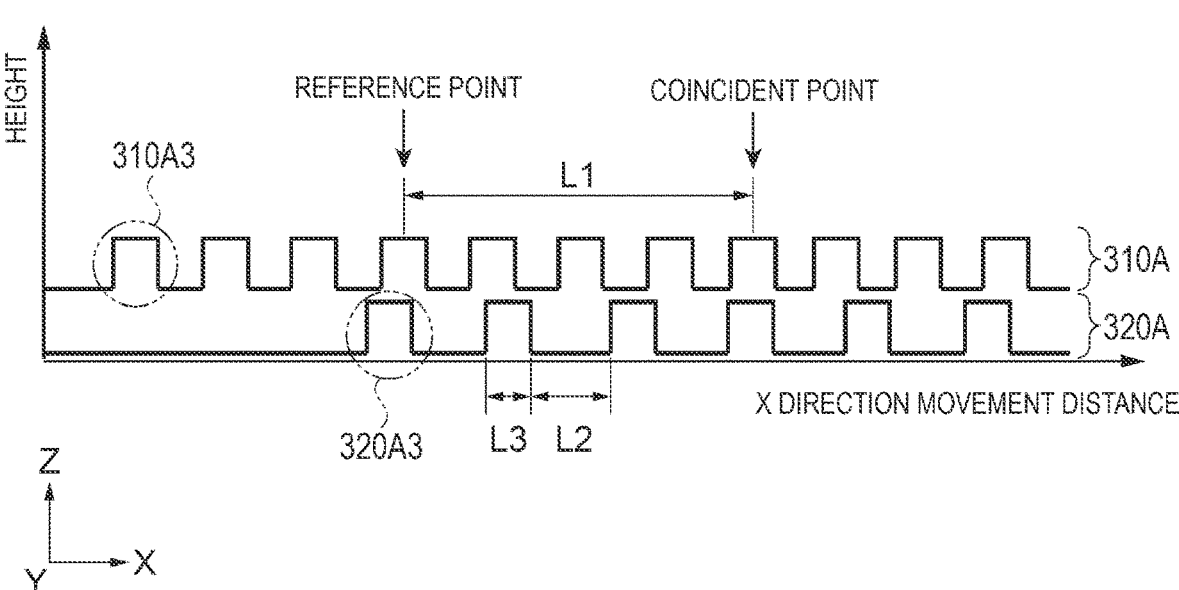
FIG. 9 is a diagram for explanation of a method of obtaining an amount of misalignment using a range sensor.
FIG. 10 is a plan view showing configurations of calibration members of a modified example.

Further, not limited to the manual obtainment of the amount of alignment as described above, but automatic obtainment of the amount of alignment as shown in FIG. 9 may be employed. FIG. 9 shows a method of calculating the calibration value using a range sensor as a sensor.

First, the measurement area of the range sensor is moved from the −X direction to the +X direction, and height information 310A3 of the first calibration member 310A and height information 320A3 of the second calibration member 320A are measured. Note that the measurements may be performed at the same time or separately performed. When the measurements are separately performed, a reference point for measurements in the X directions is necessary.

Here, the reference point of the first calibration member 310A is set to e.g., the fourth position from the side in the −X direction. Then, a coincident point of the height information 310A3 of the first calibration member 310A and the height information 320A3 of the second calibration member 320A is obtained.

As the obtainment method, for example, the number of lines of the second calibration member 320A is calculated based on a distance L1 between the reference point and the coincidence point, an interval L2, and a width L3 of the modeling line 320A1. The number of lines of the second calibration member 320A is calculated from an integer value of the calibration value. The calibration value is calculated by the following expression: calibration value=(distance L1 between reference point and coincidence point)/(interval L2+width L3 of modeling line 320A1).

As described above, it is preferable that the range sensor detecting the height in the direction crossing the first direction and the calculation unit 530 are provided, and the calculation unit 530 calculates the amount of misalignment between the first calibration member 310A and the second calibration member 320A based on the height information 310A3 of the first calibration member 310A obtained by the range sensor and the height information 320A3 of the second calibration member 320A obtained by the range sensor. According to the configuration, the calibration value is calculated based on the height information 310A3, 320A3 of the first calibration member 310A and the second calibration member 320A, and thereby, the amount of misalignment is not visually obtained by the user, but may be automatically obtained.

Furthermore, not limited to the areas of the first calibration member 310A and the second calibration member 320A as shown in FIG. 3, but, for example, as shown in FIG. 10, the calibration members may be modeled so that the area of the second calibration member 320A may be larger than the area of the first calibration member 310A.

In other words, it is preferable that a ratio occupied by the first calibration member 310A on the stage 200 is smaller than a ratio occupied by the second calibration member 320A on the stage 200. According to the configuration, the first intervals W1 of the modeling lines 310A1 of the first calibration member 310A are smaller than the second intervals W2 of the modeling lines 320A1 of the second calibration member 320A. Accordingly, when the calibration members 310A, 320A are modeled in the same area, the amount of consumption of the material used for the first calibration member 310A is larger. Therefore, the amount of consumption of the used material may be reduced by reduction of the ratio occupied by the first calibration member 310A.

Further, as described above, the widths of the modeling lines 310A1, 310B1, 320A1, 320B1 are not particularly mentioned, however, may be set as shown in FIG. 11. As shown in FIG. 11, the scale format may be selected according to the reading precision desired to be calibrated.

As a specific setting procedure, first, the intervals of the modeling lines 320A1 widths of the second calibration member 320A are determined. Then, the intervals of the ten modeling lines 320A1 widths in the second calibration member 320A are equally divided in ten, and thereby, the intervals of the modeling lines 310A1 widths of the first calibration member 310A are determined. Then, whether the intervals of the modeling lines 310A1 widths of the first calibration member 310A are larger than the minimum value of the modeling lines 310A1 widths is determined and, when the intervals are smaller than the minimum value, the procedure returns to the first. This is because, when the intervals of the modeling lines 310A1 widths of the first calibration member 310A are too small, the adjacent modeling lines 310A1 overlap and no gaps can be provided.

What is claimed is:

1. A three-dimensional modeling apparatus comprising:
a stage;
a first modeling head having a first nozzle supplying a first material to the stage;
a second modeling head having a second nozzle supplying a second material different from the first material to the stage;
a movement mechanism relatively moving at least one of the first modeling head and the second modeling head and the stage; and
a control unit controlling the first modeling head, the second modeling head, and the movement mechanism, wherein
the control unit controls the first modeling head to execute modeling of a first calibration member on the stage and the second modeling head to execute modeling of a second calibration member on the stage,
the first calibration member has a plurality of modeling lines placed at first intervals in a first direction on the stage,
the second calibration member has a plurality of modeling lines placed at second intervals larger than the first intervals in the first direction on the stage, and
a distance between the first calibration member and the second calibration member in a direction crossing the first direction is larger than a backlash gap in the movement mechanism.

2. The three-dimensional modeling apparatus according to claim 1, wherein
a foundation layer is placed between the first calibration member and the second calibration member and the stage.

3. The three-dimensional modeling apparatus according to claim 2, wherein
the foundation layer is modeled using the first modeling head or the second modeling head.

4. The three-dimensional modeling apparatus according to claim 1, wherein
the control unit models scale information corresponding to the modeling lines of the first calibration member using the first modeling head or the second modeling head, and models scale information corresponding to the modeling lines of the second calibration member using the first modeling head or the second modeling head.

5. The three-dimensional modeling apparatus according to claim 1, further comprising:

an imaging unit configured to image at least one of the first calibration member and the second calibration member; and a memory unit storing an image captured by the imaging unit.

6. The three-dimensional modeling apparatus according to claim 5, further comprising a display unit displaying images of the first calibration member and the second calibration member captured by the imaging unit, and a calibration window configured to enter by a calibration value obtained from the first calibration member and the second calibration member.

7. The three-dimensional modeling apparatus according to claim 6, further comprising an image processing unit, wherein the memory unit stores a first calibration member image obtained by imaging of the first calibration member by the imaging unit and a second calibration member image obtained by imaging of the second calibration member by the imaging unit, the image processing unit trims stored end portions of the first calibration member image and end portions of the second calibration member, and the display unit displays the trimmed first calibration member image and the trimmed second calibration member image side by side.

8. The three-dimensional modeling apparatus according to claim 6, wherein the display unit displays scale information corresponding to the modeling lines of the first calibration member and scale information corresponding to the modeling lines of the second calibration member.

9. The three-dimensional modeling apparatus according to claim 1, further comprising:

a sensor detecting a height in a direction crossing the first direction; and a calculation unit, wherein the calculation unit calculates an amount of alignment between the first calibration member and the second calibration member based on height information of the first calibration member obtained by the sensor and height information of the second calibration member obtained by the sensor.

10. The three-dimensional modeling apparatus according to claim 1, wherein a ratio occupied by the first calibration member on the stage is smaller than a ratio occupied by the second calibration member on the stage.

11. The three-dimensional modeling apparatus according to claim 1, wherein the control unit purges the first material on the stage or in a maintenance position before modeling of the first calibration member using the first modeling head, and purges the second material on the stage or in the maintenance position before modeling of the second calibration member using the second modeling head.

12. A three-dimensional modeling apparatus comprising:

a stage;

a first modeling head having a first nozzle supplying a first material to the stage;

a second modeling head having a second nozzle supplying a second material different from the first material to the stage;

a movement mechanism relatively moving at least one of the first modeling head and the second modeling head and the stage; and a control unit controlling the first modeling head, the second modeling head, and the movement mechanism, wherein the control unit controls the first modeling head to execute modeling of a first calibration member on the stage and the second modeling head to execute modeling of a second calibration member on the stage, the first calibration member has a plurality of modeling lines placed at first intervals in a first direction on the stage, the second calibration member has a plurality of modeling lines placed at second intervals larger than the first intervals in the first direction on the stage, and the control unit models scale information corresponding to the modeling lines of the first calibration member using the first modeling head or the second modeling head, and models scale information corresponding to the modeling lines of the second calibration member using the first modeling head or the second modeling head.

* * * * *